United States Patent [19]

Franco et al.

[11] Patent Number: 4,586,561

[45] Date of Patent: May 6, 1986

[54] LOW TEMPERATURE HEAT PIPE EMPLOYING A HYDROGEN GETTER

[75] Inventors: Robert J. Franco, Florham Park; Barry J. Berkowitz, Scotch Plains; Bal K. Kaul, Chester, all of N.J.

[73] Assignee: Exxon Research and Engineering Co., Florham Park, N.J.

[21] Appl. No.: 583,946

[22] Filed: Feb. 27, 1984

[51] Int. Cl.[4] ............................................. F28D 15/00
[52] U.S. Cl. .................................. 165/1; 165/104.27; 252/181.6
[58] Field of Search ............................ 165/104.27, 1

[56] References Cited

U.S. PATENT DOCUMENTS

| 3,440,140 | 4/1969 | Sawatzky . |
| 3,504,438 | 3/1970 | Geyer . |
| 3,554,183 | 1/1971 | Grover et al. ............... 165/104.26 |
| 3,788,389 | 1/1974 | Waters . |
| 3,840,068 | 10/1974 | Waters . |
| 3,902,547 | 9/1975 | Waters . |
| 3,935,900 | 2/1976 | Waters . |
| 4,036,286 | 7/1977 | Anderson et al. . |
| 4,043,387 | 8/1977 | Lamp . |
| 4,069,303 | 1/1978 | Yamadaya et al. . |
| 4,153,484 | 5/1979 | Gamo et al. . |
| 4,159,731 | 7/1979 | Biermann et al. . |
| 4,159,737 | 7/1979 | Biermann et al. . |
| 4,160,014 | 7/1979 | Gamo et al. . |
| 4,163,666 | 8/1979 | Shaltiel et al. . |
| 4,183,369 | 1/1980 | Thomas . |
| 4,194,856 | 3/1980 | Jahns . |
| 4,195,487 | 4/1980 | Fukushima ..................... 405/257 |
| 4,228,145 | 10/1980 | Gamo et al. . |
| 4,269,539 | 5/1981 | Jahns . |
| 4,401,153 | 8/1983 | Mausek et al. . |

FOREIGN PATENT DOCUMENTS

| 943038 | 10/1970 | Canada . |
| 1007875 | 4/1977 | Canada . |
| 53737 | 11/1980 | European Pat. Off. . |
| 2701893 | 7/1977 | Fed. Rep. of Germany . |
| 125201 | 3/1980 | Japan . |
| 125884 | 4/1980 | Japan . |
| 151884 | 11/1981 | Japan .......................... 165/104.27 |
| 564878 | 3/1976 | U.S.S.R. . |
| 632678 | 5/1977 | U.S.S.R. . |
| 802250 | 8/1979 | U.S.S.R. . |
| 859785 | 8/1979 | U.S.S.R. . |
| 892182 | 4/1980 | U.S.S.R. . |

OTHER PUBLICATIONS

Doklady Akad. Nauk S.S.S.R. 129, 559-62 (1959) (Abstact only).
Zhur. Neorg. Khim 5, pp. 2422-2434 (1960) E. M. Savitskii et al.
Metall 20, pp. 424-430 (1966) K. Schubert (Abstract only).
U.S. Atomic Energy Comm. NAA-SR 7132, 14 pages (1962) I. R. Tannenbaum (Abstract only).
J. Phys. Chem. 66, 370-2 (1962) W. L. Korst.
U.S. Atomic Energy Comm. ANL-6232, 20 pages (1961) R. D. Mish (Abstract only).
J. Phys. Chem. 62, pp. 76-79 (1958) G. Libowitz et al. (Abstract only).
U.S. Atomic Energy Commission LAR-10, 89 pages (1960) (Abstract only).
Summary Report "Investigation of Hydriding Characteristics of Intermetallic Compounds", by R. L. Beck (1962) Report DRI 2059.

(List continued on next page.)

Primary Examiner—Albert W. Davis, Jr.
Attorney, Agent, or Firm—Robert J. North; Edward H. Mazer

[57] ABSTRACT

A heat pipe is described for use under low temperature conditions employing preferably ammonia as the heat transport medium and a hydrogen getter material, preferably being a zirconium intermetallic alloy, capable of non-reversibly gettering hydrogen gas in the presence of ammonia and air.

11 Claims, 7 Drawing Figures

OTHER PUBLICATIONS

Arch. Eisenhartigung, vol. 14, pp. 521–526 (1941).

Izvest. St. Sektora Fiz-khim Anal. Inst. Obscheii Neorg. Khim. Akad. Nauk S.S.S.R. 25, pp. 70–80 (1959).

Compt. rend. 245, 1359–62 (1957) J. L. Andrieuz et al.

"Intermetallic Compounds", by J. H. Westbrook, pp. 511–515 (Wiley).

J. Phys. Chem. 1981, 85, pp. 3105–3116.

"Metal Hydrides", by W. M. Mueller et al., pp. 126–135.

Materials Research Bulletin, vol. 15, pp. 1149–1155 (1980).

"Advances in Heat Pipe Technology"—Proceedings (Sep. 1981) pp. 63–71 and 759–766.

"Heat Pipes", 2nd Ed., P. Dunn et al., pp. 116, 117, 180, 186–188, 280–282, 292, 318–322.

Trans. Metall. Soc. AIME, Vol. 239, pp. 1593–1600 (1967).

"Hydrogen Storage", by G. B. Sandrock, Paper 3111--Trop.

LOW TEMPERATURE HEAT PIPE EMPLOYING A HYDROGEN GETTER

BACKGROUND OF THE INVENTION

This invention relates to a low temperature heat pipe having means for removing contaminant hydrogen gas existing or collecting in the pipe which interferes with its heat transport capability. More specifically, this invention relates to an ammonia heat pipe employing a hydrogen getter material capable of removing hydrogen gas from the gaseous contents of the pipe. By the term "low temperature" as used herein is meant a temperature below 0° C. (32°F.) at which the heat pipe is operational.

A heat pipe is a heat transfer device having a high thermal conductance. It consists of a closed container made of a heat conductive material, usually tubular or cylindrical in shape, containing a heat transport medium. The container has at least one evaporation wall or section through which external heat is conducted to vaporize liquid heat transport medium and a condensation section or wall through which vaporized heat transport medium gives up its latent heat of vaporization to condense back to the liquid state. Condensed liquid returns to the evaporator section to complete a cycle which is repeated continuously as long as the temperature of the evaporator section is greater than the temperature of the condensation section and the heat transport medium is capable of evaporating and condensing at the temperatures of the sections. The net result is that heat is transferred from the environment surrounding the evaporation section. In most cases the condensation section of the heat pipe is located above the evaporation section in order that gravity assist the return of condensed vapor. Condensate may be returned from the condensation wall to the vaporization wall by way of a capillary structure such as metal gauze or capillary grooves located in the walls. Radiators such as metal fins are often mounted at the condensation section to assist heat transfer.

One of the largest uses of heat pipes at present is for permafrost stabilization for the trans-Alaskan pipeline. The trans-Alaskan pipeline stretches some 798 miles long. A little more than half of this pipeline, about 400 miles, is built above ground wherein the pipeline rests on a crossbeam attached to vertical metal support members imbedded in the ground. Much of the pipeline route is underlaid by permafrost which includes combinations of permanently frozen soil, ice and rock.

The heat pipes under these conditions are contained in the vertical support members and are designed to operate in colder months when the permafrost temperature at moderate depths (20 feet) is above the air temperature. Since the natural ground cover acts as a thermal control surface, any disturbance of this surface or any added heat flow into the ground along the metal support members could result in thawing of permafrost over a period of time. Such degradation of the permafrost could affect the vertical support members by reducing effective length, causing downdrag forces, lowering the point of fixity of the columns, decreasing the stability of slopes or increasing the potential for frost jacking which is the mechanism in which water, by alternately freezing and thawing, forces objects up and out of the ground.

Among the requirements for the heat transport media for heat pipes that are to be used at low temperature conditions are that it exist as liquid and a gas and have a vapor pressure of between about 5–200 psi at the desired operating temperature; low temperature conditions, such as exist along the Alaskan pipeline are in the temperature range of about −50° F. to +100° F., however even lower temperature conditions as may exist for example in outer space are applicable for the heat pipes described herein. Further, the heat transport medium must be safe to handle, be capable of being alternately vaporized and condensed under conditions of use; and that it be inexpensive and compatible with the material comprising the heat pipe. Typical heat transport media for use under low temperature conditions include halogenated hydrocarbons such as dichloridifluoromethane, dichlorotetrafluoroethane (Freons®, E. I. Dupont DeNemours), 1,1-difluoroethane, 1,1,1,-chlorodifluoroethane, hexafluoroacetone, hydrocarbons such as butane and propane, ammonia, acetone, methyl chloride, ethyl chloride, methyl formate and ethyl amine. Preferred low temperature working fluids for use under arctic weather conditions, particularly during the winter months, are those having boiling points substantially below 0° C., i.e. ammonia and low molecular weight halogenated hydrocarbons, i.e. Freons ™, and particularly preferred being ammonia.

In addressing the problem of the degradation of the permafrost in the vicinity of the above ground Trans-Alaskan pipeline sections, about 120,000 carbon steel heat pipes using ammonia as the heat transport medium have been installed using two heat pipes for each vertical support member. During the winter months when the air temperature is below the ground temperature, the heat pipe functions to remove heat from the permafrost thus maintaining its integrity during the subsequent summer months when thawing can potentially occur.

A problem with the operation of the heat pipes is the presence of small amounts of non-condensable hydrogen gas which can collect, for example, by a corrosion reaction between water, which may be an impurity in the ammonia and the carbon steel of the pipe. The hydrogen gas accumulates primarily in the condenser section and inhibits the ammonia vapor from condensing at the top of the condensation section. This results in "condenser blockage" and leads to reduced heat removal capability. Thus, a means or method of removal of such contaminant hydrogen is vital if the permafrost is to be prevented from degrading.

In the art, the use of heat pipes in permafrost aboveground and underground structural assemblies, in which liquid ammonia can be a working fluid is well-known, as exemplified in the following patents: U.S. Pat. Nos. 4,036,286; 4,269,539; 4,194,856; 3,840,068; 3,788,389; 3,935,900 and 3,902,547.

Also, the use of a hydrogen getter in a heat pipe using water as the heat transport medium is exemplified in U.S. Pat. No. 4,043,387 which specifically discloses the use of tantalum, titanium or niobium as the hydrogen getter in the system. However, ammonia is not suggested or disclosed as an applicable heat transfer medium.

In addition, U.S. Pat. No. 4,159,737 describes a heat pipe having at least one getter being lanthanum, yttrium, or scandium, combined with barium, calcium or lithium, for removing gaseous impurities including hydrogen, and using liquid sodium, potassium or cesium, as the heat transport medium. The getter is described as extending from the vaporization wall to the condensation wall and is active at the operating temperature. However, the getter is described as not being very active at low temperatures.

Furthermore, metal alloys containing zirconium and manganese as components and mischmetal alloys which are useful as hydrogen storage materials are disclosed in U.S. Pat. No. 4,163,666; Japanese published Patent Applications Nos. 6125-201 and 6125-202; U.S. Pat. No. 4,228,145 and "Intermetallic Compounds" edited by J. H. Westbrook, Wiley (1967) New York, pp. 511-514 which discloses zirconium intermetallic compounds and their hydriding characteristics.

However, none of the above-cited references describe or specifically teach a heat pipe useful under low temperature conditions, such as arctic weather conditions, utilizing a low temperature working fluid, such as ammonia and further containing a hydrogen getter for successfully removing contaminant hydrogen gas from the system under the operating conditions. Further, what is not particularly taught is the gettering of contaminant hydrogen gas in the presence of oxygen-containing impurities, such as air and/or water, which may impede the gettering of hydrogen under the climatic conditions which the pipe is exposed to. Furthermore, it is not disclosed how to non-reversibly getter contaminant hydrogen gas under such conditions such as to effectively remove the gaseous hydrogen from the pipe heat exchanger system during its life of operation.

SUMMARY OF THE INVENTION

It has been found that contaminant hydrogen gas can successfully be removed and gettered from a heat pipe using a low temperature heat transport medium, preferably ammonia, by the use of a hydrogen getter material, preferably being a zirconium intermetallic alloy, which is effective even in the presence of air and/or water. Further, it has been found that the alloy non-reversibly getters the hydrogen gas such that the hydrogen, once removed, does not reenter the gaseous ammonia system to cause blockage during the operating cycle of the pipe. Thus, a heat pipe employing a low temperature heat transport medium, particularly ammonia, in the arctic environment can be operated year round without having its heat removing efficiency substantially impaired by the presence of contaminant hydrogen gas.

More specifically the subject invention comprises a hydrogen getter assembly for removing contaminant hydrogen gas from an ammonia heat pipe which assembly can be mounted on the pipe on top or on the side, or located inside the pipe on the condensation wall or section. In one embodiment, the getter assembly comprises a housing having a retaining element and an inlet communicating with the heat pipe. Mounted inside the housing is a hydrogen getter in particulate form located inside the chamber. The hydrogen collected and present in a heat pipe employing ammonia as the heat transport medium is preferably gettered with an intermetallic zirconium alloy. The present invention requires that the getter remove hydrogen from the heat pipe, such that at heat pipe operating temperatures and conditions, a loss of efficiency in the cooling of the permafrost is not experienced. Also required is that the hydrogen is non-reversibly gettered, i.e., is not released back to the heat pipe interior contents during the working life of the pipe.

By this invention there is provided a heat pipe comprising a low temperature heat transport medium and an intermetallic alloy hydrogen getter material capable of gettering contaminant hydrogen gas in the presence of air.

The heat pipe can further comprise ammonia as the heat transport medium and (a) an evaporator means, for evaporating the ammonia;

(b) a condenser means, for condensing the evaporated ammonia and communicating with said evaporator means (a) to allow recycle of the condensed ammonia back to said evaporator means;

(c) a hydrogen getter assembly comprised of a retaining element and a hydrogen getter material, said assembly communicating with said condenser means to allow contact between said hydrogen getter material and the hydrogen gas, if present, said getter material capable of gettering hydrogen gas in the presence of ammonia and air.

The heat transport medium has a boiling point substantially below 0° C. (at 1 atmosphere) and includes low molecular weight halogenated hydrocarbons and ammonia.

The hydrogen getter material must be non-reactive toward the heat transport medium and preferably forms hydrides below 100° F. in the presence of small amounts of air and/or water.

Further provided is a hydrogen getter assembly comprising:

an intermetallic alloy hydrogen gettering material, capable of gettering hydrogen gas in the presence of ammonia and air.

Furthermore, there is provided a process for removing contaminant $H_2$ gas from a heat pipe employing ammonia as the heat transport medium comprising contacting said hydrogen gas in the presence of ammonia and air with an intermetallic alloy hydrogen getter material.

DETAILED DESCRIPTION OF THE PREFERRED EMBODIMENTS

Figure 1:
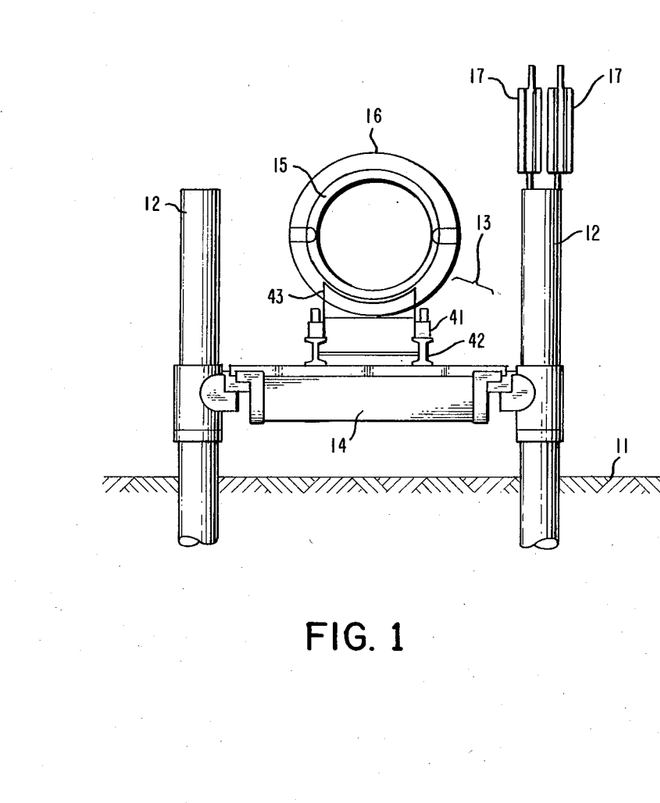
FIG. 1 is an end view of a section of the oil pipe along the trans-Alaskan pipeline mounted above ground.

FIG. 1 shows a front cross-sectional view of a pipeline section along the trans-Alaskan pipeline mounted above the ground 11 which consists mainly of permafrost. The pipe is mounted on vertical support members 12 spaced apart 50 to 70 feet. A saddle assembly shown generally by 13 rests upon a cross beam 14 mounted between the vertical support members 12. The saddle assembly consists of saddle 43, leveler 41 and slide shoes 42. The pipe 14 having an outer layer of insulation 16 rests on the saddle assembly. The frozen soil below the pipeline is overlaid with a gravel pad that contains a layer of plastic foam insulation in some sections (not shown). Two heat pipes 17 are placed against the inside wall of each vertical support member. Since the natural ground cover acts as a thermal-control surface, any heat flow into the ground along the metal vertical support pipes could result in warm permafrost over a period of time which in turn could affect the vertical support members by reducing their effective length, causing downdrag forces, lowering the point of fixity of the columns and other hazards which may threaten the stability and integrity of the columns. The heat pipes 17 act to prevent permafrost degradation around the vertical support members by seasonal refrigeration of the soil and foundation structure as will be described in more detail hereafter.

Figure 2:
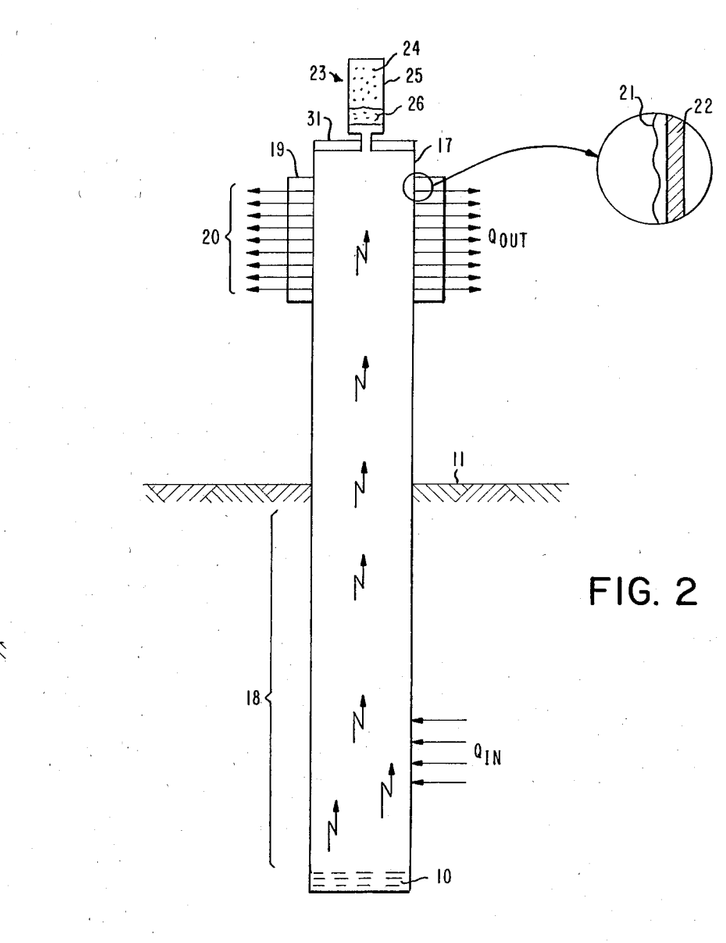
FIG. 2 is a cross-sectional view of the heat pipe partially embedded in the ground having mounted thereon one embodiment of a hydrogen getter assembly, attached vertically according to the invention.

FIG. 2 shows a sectional view of a heat pipe 17 inserted in the permafrost ground 11 as shown in FIG. 1 having a hydrogen gas getter assembly 23 mounted vertically on top being inserted through cover plate 31. The pipe itself is a tubular member some 35 feet in length completely closed at both ends. About half of the heat pipe extends above ground. During a substantial part of the season along the Alaskan pipeline the temperature of the air is less than the temperature of the ground. This condition is necessary for the heat pipe to function. Ammonia, $NH_3$, having a boiling point of $-33.5°$ C. (1 atm) is used as the heat transport medium 10. The lower portion of the heat pipe constitutes the evaporator section 18. In this section liquid ammonia is evaporated by transfer of heat (Q in as shown by the lower vertically directed arrows) from the relatively warm ground through the heat pipe wall. The ammonia, now in the vapor phase, rises, as shown by the arrows, to the upper portion of the pipe which is provided with a finned radiator 19. The area of the heat pipe circumscribed by the radiator defines a condenser section 20 in which the heat of condensation Q of the ammonia vapor is transferred through the radiator to the relatively cool atmosphere (Q out as shown by the upper vertically directed arrows) and the ammonia condenses to liquid. The condensed ammonia liquid forms a thin film 21 on the wall 22 of the pipe as shown by the expanded view where it descends by gravity or capillary action a layer of gauze may be applied to the inside walls of the heat pipe or the heat pipe walls may have formed therein capillary grooves as well known in the art (not shown).

There are many ways in which hydrogen can collect in the heat pipe. For example, in many cases, the ammonia in the heat pipe contains small or trace amounts of water. This water, which can be present as a result of the initial washing/preparation of the pipe, is believed to react with the carbon steel of the pipe structure to form hydrogen gas. The hydrogen gas is non-condensable at the temperatures developed in the pipe. It occupies the condensation section of the heat pipe and acts as an insulator preventing the vaporized ammonia from condensing. If the hydrogen gas is allowed to remain in the heat pipe for too long the heat pipe will loose its ability to remove heat from the permafrost with the resulting danger to the vertical support members as discussed previously.

In order to purge the pipe of hydrogen, a hydrogen getter assembly according to the invention is mounted in the vicinity of the condenser section. The getter assembly 23 is shown in FIG. 2 mounted at the top of the heat pipe having located therein a getter material 24 contained in the getter canister 25 and held in place by retaining element 26 which is sufficiently porous to allow gaseous $NH_3$ and $H_2$ through to contact the getter material. The retaining element should also preferably not form condensed ammonia, for example, by capillary action.

Figure 3:
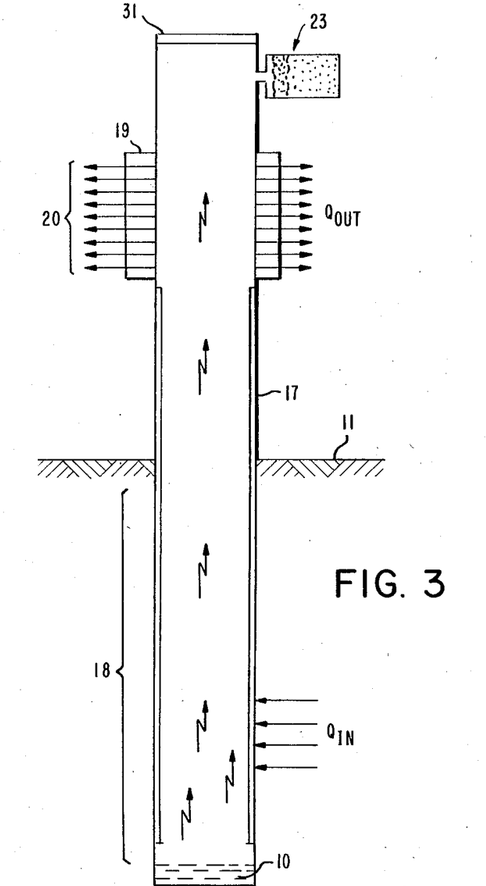
FIG. 3 is a cross-sectional view of another embodiment of the heat pipe partially embedded in the ground having mounted on the side of the condensation section a hydrogen getter assembly; according to the invention.

Referring to FIG. 3, another embodiment of the heat pipe having a getter assembly 23 is depicted where the getter assembly is mounted on the side of the heat pipe 17 rather than on the top. This embodiment allows easier installation of said getter assembly to the heat pipe since it avoids a double seal penetration process as generally practiced for the assembly of the heat pipe illustrated in FIG. 2. The getter assembly can be attached to the assembled and charged heat pipe (which charging is generally performed under vacuum to avoid the entry of moisture and/or air) by conventional hot tapping methods or non-welding penetration methods. Preferably, the getter assembly is attached to the already charged ammonia heat pipe by the technique of non-welding penetration.

Figure 4:
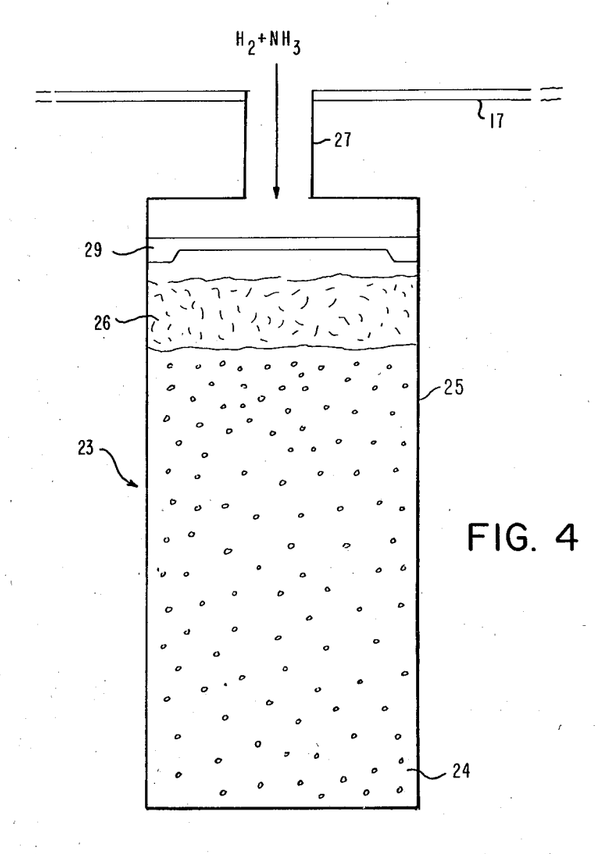
FIG. 4 shows a cross-section of the getter assembly of FIG. 3.

FIG. 4 shows a preferred embodiment of the hydrogen getter assembly 23, as depicted in FIG. 3 wherein the canister housing 25 is inserted into the heat pipe wall 17. Hydrogen and ammonia enter into the interior of the canister 25 by means of the communication inlet 27 and the resulting initial pressure is sufficient to break the rupture disk 29. The getter material is retained in position by retaining element 26 which is porous and permeable to hydrogen and ammonia but is inert and has sufficient strength to provide a barrier to the movement of the getter material into the heat pipe itself. Further, the retaining element preferably is of such material and construction to avoid trapping ammonia by capillary condensation in the canister. Suitable materials as the retaining element include glass wool, fiber glass, steel wool, stainless steel wool, mineral wool and gauze.

In addition, there may optionally be present valve (not shown) positioned between the canister 25 and exterior condensation wall and operating with the communication inlet 27 in FIG. 3. The valve 28 is designed to prevent external leakage of ammonia at low temperatures. Use of the valve is optional when preparing the heat pipe by non-welding penetration but preferred when utilizing, for example, hot tapping methods.

In addition to said valve in the communication inlet 27, there can optionally be joints formed by fittings, such as quick-connects, which allow for closing and detaching the canister after use and protecting the canister contents from air, and the heat tube atmosphere from escaping, during the detachment step.

A further embodiment of the canister assembly is reflux tube (not shown) which connects canister 25 with heat tube 17 which serves as a reflux element or return assembly for any ammonia that happens to condense in the canister interior.

Figure 5:
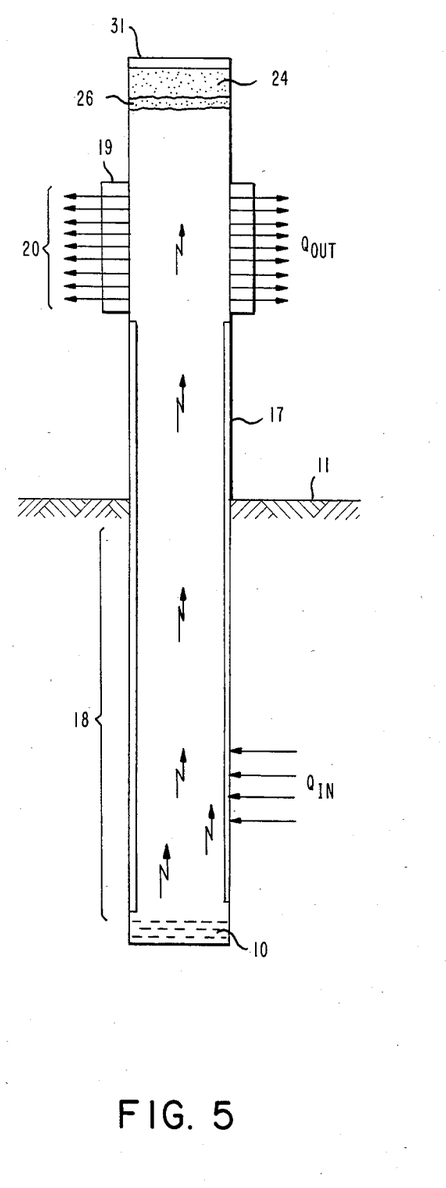
FIG. 5 is a cross-sectional view of another embodiment of the heat pipe partially embedded in the ground having a hydrogen getter assembly mounted internally in the pipe in the condensation section according to the invention.

FIG. 5 shows another embodiment of the heat pipe wherein the hydrogen getter material 24 is positioned directly inside the pipe in the condenser section. The getter material is retained in place by retaining element 26 which in this embodiment can be gauze, mineral wool, stainless steel wool and the like.

Figure 6:
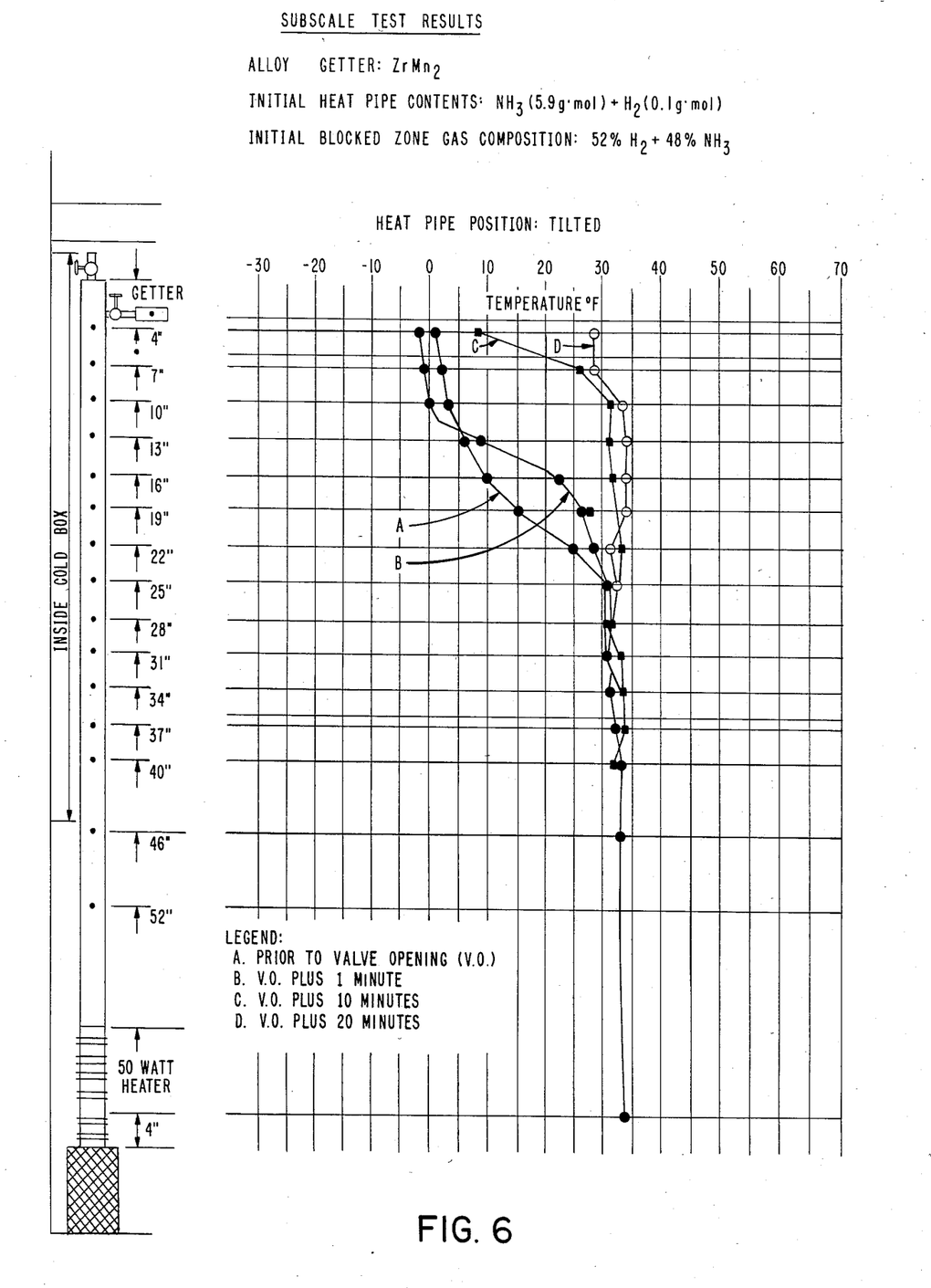
FIG. 6 is an illustration of the gettering activity of $ZrMn_2$ in an $NH_3/H_2$ atmosphere in an subscale pipe under simulated arctic temperature conditions.

FIG. 6 illustrates a subscale test performed with $ZrMn_2$ in the presence of $NH_3$—$H_2$ atmosphere in a subscale heat pipe under simulated temperature condition. The pipe was charged with $NH_3$—$H_2$ atmosphere and temperature readings were taken at various checkpoints along the pipe as indicated. The non-uniformity of temperature as seen in the decreasing temperature progressing to the top of the tube is evidence of the "blocking" action of contaminant hydrogen gas. The valve was then opened allowing contact between the getter and the $NH_3$—$H_2$ atmosphere and temperature readings at the indicated condenser heights were subsequently taken at 1, 10 and 20 minute intervals. The relative uniformity of the line D indicates the efficient gettering ability of $ZrMn_2$. Further details and discussion are found in Example 1.

Figure 7:
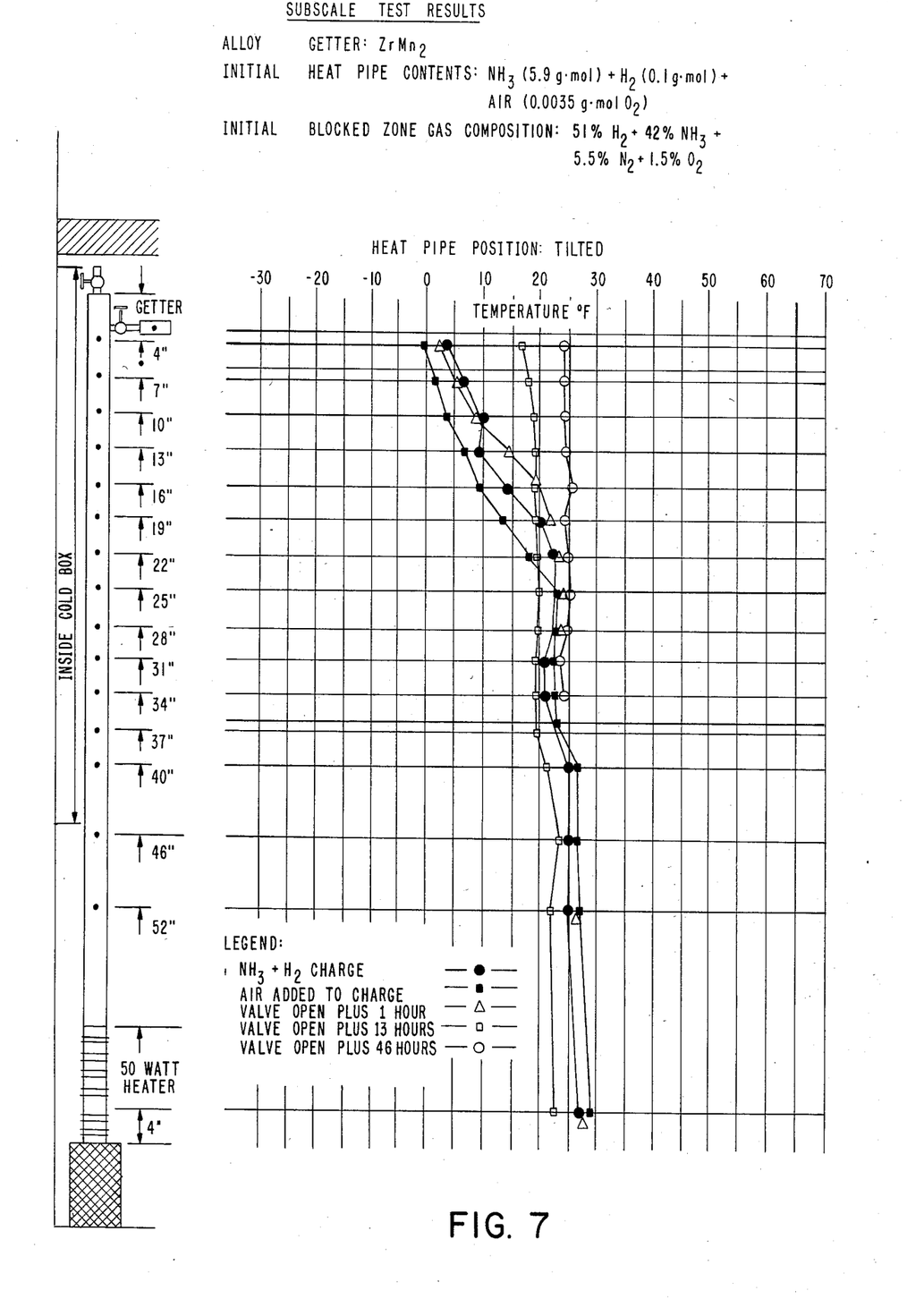
FIG. 7 is similar to FIG. 6 illustrating the gettering activity of $ZrMn_2$ in an $NH_3/H_2$/air atmosphere under simulated arctic temperature conditions.

FIG. 7 is an illustration of a run similarly made as in FIG. 6, except that an atmosphere of $NH_3$—$H_2$-air was utilized under substantially the same conditions. As is seen, after 46 hours, the initial hydrogen blockage has been substantially eliminated. Further discussion of the run is given in Example 1.

Getter materials that are applicable in the low temperature heat pipe are those that have an affinity for, and can efficiently getter, hydrogen gas under the low temperature operating conditions experienced by the pipe in its intended environment. The gettering affinity for hydrogen can be chemisorption, physisorption or preferably hydride formation, and combinations thereof. Preferably required is the ability to getter hydrogen in the presence of ammonia, and particularly in the presence of oxygen-containing impurities such as water, oxygen and/or air. Preferably, the getter material acts by forming metal hydrides with the hydrogen gas at temperatures below 100° F. One suitable class of materials that are applicable in this respect are zirconium intermetallic alloys some of which are described in the reference "Intermetallic Alloys", supra, hereby incorporated by reference to that purpose. Representative examples include $ZrMn_2$, Zr—$Mn_x$ where $x=1.8$–$3.8$, ZrNi, ZrAl, Zr—Y—Fe, Zr—Ti—Ni, or mixtures thereof. Preferred for use in an arctic environment of $-50°$ F. to $+100°$ F. are $ZrMn_2$ or ZrNi.

The quality of getter used is a function of the amount of hydrogen present and should at least be equal to that amount and preferably in excess. The amount of getter will vary depending on its particle size, absorption characteristics, and the like, and in general it is recommended that about 2–3 times the stoichiometric amount of getter required be used.

Other desirable characteristics of said zirconium intermetallic alloy are that it preferably should be able to form a stable hydride below 100° F. in an ammonia-hydrogen atmosphere and particularly an ammonia-air-hydrogen atmosphere. The alloy should not have the susceptibility to be easily poisoned by impurities, such as oxygen-containing impurities normally present in a heat pipe, such as by forming a stable oxide coating.

EXAMPLE 1

A subscale (6" long) heat pipe as illustrated in FIGS. 6 and 7 was used to test the ability of various hydride-forming metal alloys (getters) to eliminate hydrogen from an ammonia working fluid.

The pipe utilized a 50 watt heater in the evaporator section (simulating the soil) at 25° to 40° F. and a section of the heat pipe in a cold box as the condenser at $-5°$ to $+5°$ F. (simulating wintertime ambient air). The pipe was charged with ammonia under vacuum and about 0.1 g-mol $H_2$ gas to establish a blocked length, i.e., a length of the condenser where the temperature approaches the cold box rather than the evaporator temperature. This amount of $H_2$ is slightly more than would be expected in heat pipes under actual operating conditions. The pipe was used to screen three getters which form metal hydrides: $ZrMn_2$, ZrNi, and Mischmetal (Mm)—$Ni_2$. Each canister contained enough alloy to getter 0.5 g-mol $H_2$ (5 times the quantity in the heat pipe). First, the alloys were tested in $NH_3$—$H_2$; thereafter, a fresh canister of each alloy was tested in $NH_3$—$H_2$-air (in which the air had an initial composition of 0.0035 g-mol $O_2$ and 0.0132 g-mol $N_2$ to simulate the effects of air ingress during installation).

Since blocked length is proportional to the quantity of hydrogen present, the tests were monitored, as indicated in FIGS. 6 and 7, by measuring the temperature profile along the length of the heat pipe, which was instrumented with thermocouples along its length, using a 3" spacing for the getters in the area of the initial blocked length.

To accelerate results, the quantity of air tested greatly exceeded what would enter during field installation; the average quantity of air in the subscale tests was at least 14 times greater than the greatest amount expected in the field. Air was charged into the subscale test after a hydrogen-blocked profile was established so that the quantities of hydrogen and air could be established separately.

The getter alloys worked in the $NH_3$—$H_2$ environment; Mm—$Ni_2$, however, gave spurious results because it seemingly did not work until the pipe was tilted. Since it was believed this could be the result of ammonia condensate covering the alloy, the heat pipe was tilted in all subsequent tests.

Air adversely affected the kinetics of reaction of all getters. However, $ZrMn_2$ was able to eliminate substantially all of the hydrogen blockage in the presence of air after 46 hours. ZrNi was partially successful in removing hydrogen blockage and still active after 22 hours. By contrast, the Mm—$Ni_2$ getter failed to remove any significant amount of hydrogen blockage in the presence of air.

The summarized results of the subscale test data are presented below in Table I and the data for $ZrMn_2$ in $NH_3$—$H_2$ and $NH_3$—$H_2$-air are illustrated in FIGS. 6 and 7, respectively.

TABLE I

| | Subscale Test Results | |
|---|---|---|
| Device | $NH_3$—$H_2$* | $NH_3$—$H_2$—air* |
| $ZrMn_2$ getter | 20 minutes | 46 hours |
| ZrNi getter | 3.5 hours blockage removed after 22 hours, and device still active | about 20% hydrogen |
| Mischmetal-$Ni_2$ getter | 40 hours hydrogen blockage still present after 25 hours | substantially all |

*Time required to eliminate approximately 0.1 g-mol hydrogen gas.

EXAMPLE 2

Subsequent field tests in Alaska showed that $ZrMn_2$ and ZrNi were completely successful in completely eliminating blockage where the amount of blockage at the start of the test was about 50-70% and 50-80% respectively. The Mischmetal-nickel getter, however, failed to eliminate any blockage where the amount of blockage was 50-70% at the start of the test. The % blockage is expressed as % of total condenser length.

The field tests were carried out with fullscale heat pipes which were contaminated with hydrogen, water, air and impurities normally found in heat pipes.

Analyses of the heat pipe contents of pipes that were "condenser blocked" showed that they contained up to 0.06 g mol. hydrogen, in the absence of getter; up to 3000 ppm water in the liquid ammonia; and up to 20 ml. air (at STP).

Sufficient getter was employed to getter about 2 g-mol $H_2$ gas. The field test results are presented below in Table II as determined by aerial infrared photography conducted about three months after installation.

TABLE II
Field Test Results

| Device | # of Devices Tested | Amount of Blockage* at Start of Test | Results |
|---|---|---|---|
| $ZrMn_2$ | 12 | Min: 50 Max: 70 | All devices successful in completely eliminating blockage. |
| ZrNi | 2 | Min: 50 Max: 80 | Both devices successful in completely eliminating blockage. |
| Mischmetal - $Ni_2$ | 2 | Min: 50 Max: 70 | Both devices failed to eliminate any blockage. |

*Expressed as % of total condenser length.

As seen from the above results, $ZrMn_2$ and ZrNi are applicable in $NH_3$—$H_2$ as well as $NH_3$—$H_2$-air environments. Mischmetal-$Ni_2$, however, was not effective.

Although the invention has been described with reference to particular embodiments thereof, it should be realized that various changes and modifications may be made without departing from the spirit and scope of the invention.

What is claimed is:

1. A heat pipe comprising a low temperature heat transport medium selected from the group consisting of ammonia and low molecular weight halogenated hydrocarbons and an intermetallic alloy hydrogen getter material selected from the group consisting of $ZrMn_2$, $ZrMn_x$ where $x = 1.8-3.8$, ZrNi, ZrAl, ZrYFe, ZrTiNi and mixtures thereof.

2. The heat pipe of claim 1 wherein said heat transport medium has a boiling point substantially below 0° C. at atmospheric pressure.

3. The heat pipe of claim 1 employing ammonia as the heat transport medium, in which hydrogen contaminant gas can be present, comprising:
 (a) an evaporator means, for evaporating the ammonia;
 (b) a condenser means, for condensing the evaporated ammonia and communicating with said evaporator means (a) to allow recycle of the condensed ammonia back to said evaporator means;
 (c) a hydrogen getter assembly comprised of a retaining element and said hydrogen getter material, said assembly communicating with said condenser means to allow contact between said hydrogen getter material and the hydrogen gas, if present, said getter material capable of gettering hydrogen gas in the presence of ammonia and air.

4. The heat pipe of claim 3 wherein said hydrogen getter assembly is positioned on the top of said heat pipe communicating with said condenser means (b).

5. The heat pipe of claim 3 wherein said hydrogen getter assembly is positioned on the side of said heat pipe communicating with said condenser means (b).

6. The heat pipe of claim 3 wherein said hydrogen getter assembly is positioned directly between said evaporator means (a) and said condenser means (b).

7. The heat pipe of claim 3 wherein said hydrogen getter material is capable of non-reversibly gettering hydrogen below 100° F. in the presence of ammonia, air and small amounts of water.

8. The heat pipe of claim 3 wherein said zirconium alloy is selected from $ZrMn_2$ and ZrNi.

9. A heat pipe comprising liquid ammonia as the heat transport medium and $ZrMn_2$ as the hydrogen getter material for gettering contaminant hydrogen gas which may be present.

10. A process for removing contaminant $H_2$ gas from a heat pipe employing ammonia as the heat transport medium comprising contacting said hydrogen gas in the presence of ammonia and air with an intermetallic alloy hydrogen getter material selected from the group consisting of $ZrMn_2$, $ZrMn_x$ where $x = 1.8-3.8$, ZrNi, ZrAl, ZrYFe, ZrTiNi and mixtures thereof.

11. The process of claim 10 wherein said zirconium alloy is selected from $ZrMn_2$ and ZrNi.

* * * * *